United States Patent
Suleiman et al.

(10) Patent No.: US 11,939,912 B2
(45) Date of Patent: Mar. 26, 2024

(54) WATER FUEL EMULSION SYSTEM AND METHOD FOR GAS TURBINE

(71) Applicant: General Electric Company, Schenectady, NY (US)

(72) Inventors: Baha Suleiman, Schenectady, NY (US); Hatem Selim, Schenectady, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/817,675

(22) Filed: Aug. 5, 2022

(65) Prior Publication Data
US 2023/0050114 A1  Feb. 16, 2023

(30) Foreign Application Priority Data

Aug. 12, 2021  (EP) .................................. 21191157

(51) Int. Cl.
| | |
|---|---|
| *F02C 3/30* | (2006.01) |
| *F02C 7/22* | (2006.01) |
| *F02C 9/40* | (2006.01) |
| *F23K 5/12* | (2006.01) |

(52) U.S. Cl.
CPC .................. *F02C 3/30* (2013.01); *F02C 7/22* (2013.01); *F02C 9/40* (2013.01); *F23K 5/12* (2013.01); *F05D 2240/36* (2013.01); *F05D 2260/99* (2013.01); *F23K 2300/103* (2020.05)

(58) Field of Classification Search
CPC ........ F02C 3/30; F02C 3/305; F05D 2270/16; F23K 5/12; F23K 2300/103
See application file for complete search history.

(56) References Cited

U.S. PATENT DOCUMENTS

| | | | |
|---|---|---|---|
| 5,298,230 A | * | 3/1994 | Argabright ......... B01D 53/8625 423/239.1 |
| 5,344,306 A | | 9/1994 | Brown et al. |
| 5,974,780 A | | 11/1999 | Santos |
| 8,973,366 B2 | | 3/2015 | Zhang et al. |
| 9,719,681 B2 | | 8/2017 | Zhang et al. |

(Continued)

FOREIGN PATENT DOCUMENTS

| | | |
|---|---|---|
| DE | 2757419 A1 | 7/1978 |
| EP | 2587022 A2 | 5/2013 |

(Continued)

OTHER PUBLICATIONS

European extended search report of EP No. 21191157.3, dated Feb. 1, 2022, 11 pgs.

*Primary Examiner* — Scott J Walthour
(74) *Attorney, Agent, or Firm* — Fletcher Yoder, P.C.

(57) ABSTRACT

A gas turbine engine includes a first combustor having a first fuel nozzle, wherein the first fuel nozzle is configured to supply a water fuel emulsion into the first combustor. The water fuel emulsion includes a water-in-fuel (WIF) emulsion having a plurality of water droplets dispersed in a fuel, wherein the plurality of water droplets is configured to vaporize within the fuel to cause micro-explosions to atomize the fuel, and the atomized fuel is configured to combust to generate a combustion gas. The gas turbine engine further includes a turbine driven by the combustion gas from the first combustor.

20 Claims, 6 Drawing Sheets

(56) References Cited

U.S. PATENT DOCUMENTS

| | | | |
|---|---|---|---|
| 2012/0192542 A1* | 8/2012 | Chillar | F02C 9/40 |
| | | | 60/39.463 |
| 2013/0098056 A1* | 4/2013 | Zhang | F02C 3/305 |
| | | | 60/39.55 |
| 2016/0273449 A1* | 9/2016 | DiCintio | F23D 11/16 |
| 2019/0107049 A1 | 4/2019 | Suleiman et al. | |

FOREIGN PATENT DOCUMENTS

| | | | | |
|---|---|---|---|---|
| JP | 2010138797 A | 6/2010 | | |
| WO | WO-2014134115 A1 * | 9/2014 | | B01F 13/1027 |

\* cited by examiner

WATER FUEL EMULSION SYSTEM AND METHOD FOR GAS TURBINE

CROSS-REFERENCE TO RELATED APPLICATIONS

This application claims priority pursuant to 35 U.S.C. 119(a) to European Patent Application No. 21191157.3, filed Aug. 12, 2021, which application is incorporated herein by reference in its entirety.

BACKGROUND

The present application relates generally to a gas turbine system and, more particularly, to control of combustion in a combustor of the gas turbine system.

A gas turbine system may include a compressor section, a combustor section, and a turbine section. The combustor section is configured to combust fuel with air to generate hot combustion products to drive one or more turbine stages in the turbine section. Unfortunately, the combustion process may produce undesirable exhaust emissions, such as nitrogen oxides (NOx) and soot. Accordingly, it would be desirable to reduce the exhaust emissions without adversely impacting performance and without substantially increasing costs associated with operating the gas turbine system.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a gas turbine engine includes a first combustor having a first fuel nozzle, wherein the first fuel nozzle is configured to supply a water fuel emulsion into the first combustor. The water fuel emulsion includes a water-in-fuel (WIF) emulsion having a plurality of water droplets dispersed in a fuel, in which the plurality of water droplets is configured to vaporize within the fuel after injection into the combustor to cause micro-explosions to atomize the fuel, and the fuel is configured to combust to generate a combustion gas. The gas turbine engine further includes a turbine driven by the combustion gas from the first combustor.

In certain embodiments, a system includes a controller configured to control a supply of a water fuel emulsion into a first combustor of a gas turbine engine via a first fuel nozzle. The water fuel emulsion includes a water-in-fuel (WIF) emulsion having a plurality of water droplets dispersed in a fuel, wherein the plurality of water droplets is configured to vaporize within the fuel to cause micro-explosions to atomize the fuel, and the fuel is configured to combust to generate a combustion gas to drive a turbine of the gas turbine engine.

In certain embodiments, a method includes supplying a water fuel emulsion into a first combustor of a gas turbine engine via a first fuel nozzle, wherein the water fuel emulsion includes a water-in-fuel (WIF) emulsion having a plurality of water droplets dispersed in a fuel. The method further includes vaporizing the plurality of water droplets within the fuel to cause micro-explosions to atomize the fuel. The method further includes combusting the fuel to generate a combustion gas to drive a turbine of the gas turbine engine.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed techniques will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including,"

and "having" are intended to be inclusive and mean that there may be additional elements other than the listed elements.

The disclosed embodiments relate to water fuel emulsions, such as water-in-fuel (WIF) emulsions and/or fuel-in-water (FIW) emulsions, configured to improve combustion in gas turbine engines. The WIF emulsions improve combustion at least due to micro-explosions of small water droplets within larger fuel droplets, thereby improving atomization of the fuel. For example, the WIF emulsion is generated with small water droplets dispersed in a continuous phase of liquid fuel. The WIF emulsion is injected into a combustor as a spray (i.e., a primary atomization) of droplets (i.e., small water droplets within larger fuel droplets). The micro-explosions cause a secondary atomization of the fuel, i.e., the small water droplets evaporate within the larger fuel droplets, causing the larger fuel droplets to explode or break apart into smaller fuel droplets. The smaller fuel droplets (i.e., finely atomized fuel) then rapidly evaporate and mix with the air, resulting in more uniform mixing of the fuel with air, more uniform combustion and temperature distribution, and reduced emissions of NOx and soot. The FIW emulsions can also provide benefits for combustion in gas turbine engines. The FIW emulsion is generated with small fuel droplets dispersed in a continuous phase of water. In either case, the water fuel emulsions (e.g., WIF or FIW emulsions) may help to better control the combustion process, emissions levels, water usage, and other aspects of operation of the gas turbine engine. The water fuel emulsions may be particularly beneficial with low grade fuels, viscous fuels, heavy fuel oil (HFO), crude oil, diesel fuel, and/or contaminated fuels.

Figure 1:
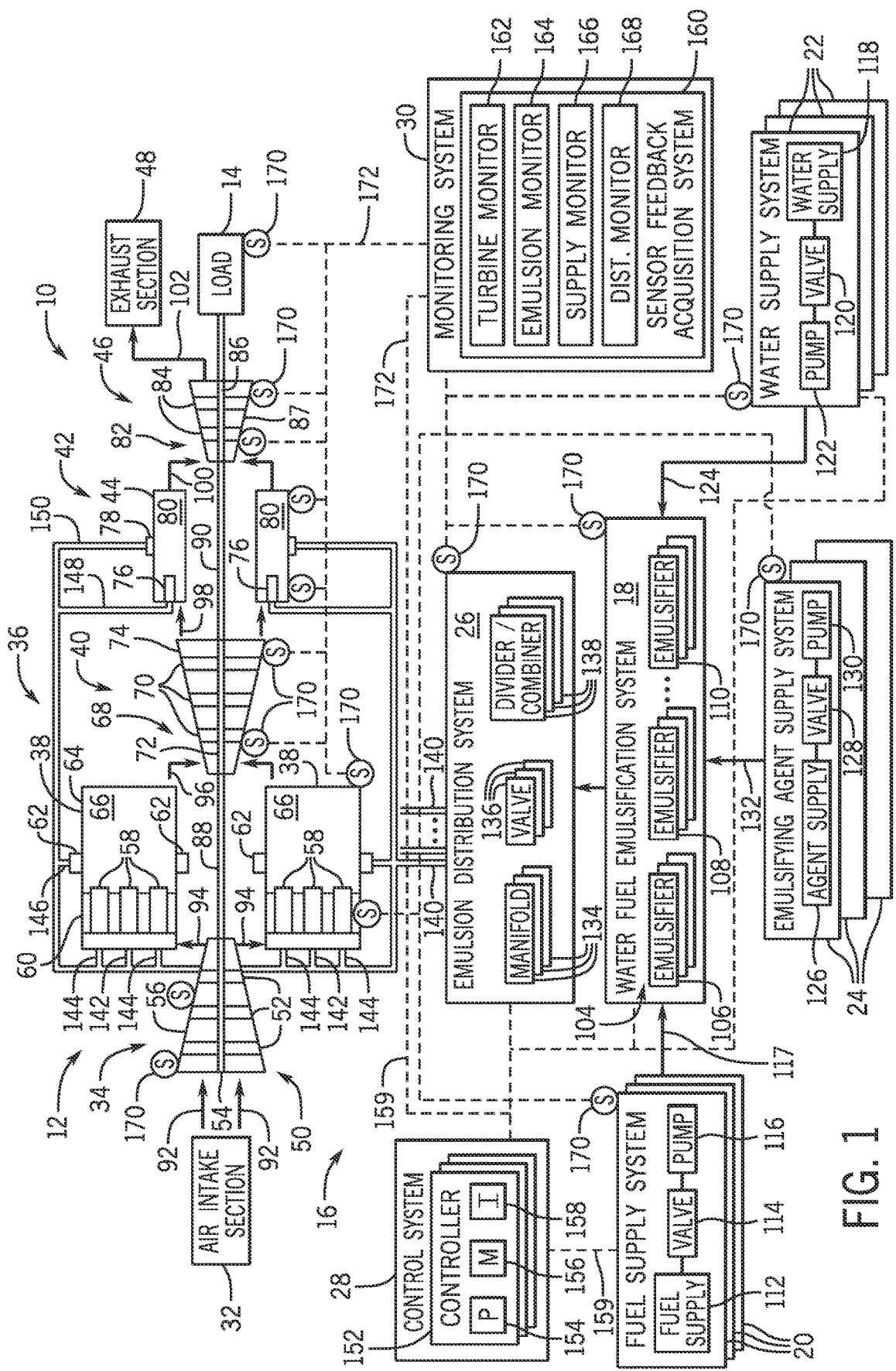
FIG. 1 is a schematic of an embodiment of a gas turbine system having a water fuel emulsification system configured to generate a water fuel emulsion, including a water-in-fuel (WIF) emulsion.

FIG. 1 is a schematic of an embodiment of a gas turbine system 10 having a gas turbine engine 12 drivingly coupled to a load 14, such as an electrical generator. The gas turbine system 10 also includes a fluid supply system 16 coupled to the gas turbine engine 12. As illustrated, the fluid supply system 16 includes a water fuel emulsification system 18 coupled to one or more fuel supply systems 20, one or more water supply systems 22, and one or more emulsifying agent supply systems 24. Additionally, the water fuel emulsification system 18 is coupled to an emulsion distribution system 26 configured to distribute a water fuel emulsion to the gas turbine engine 12. The gas turbine system 10 also includes a control system 28 and a monitoring system 30 coupled to the fluid supply system 16 and the gas turbine engine 12.

As discussed in further detail below, the water fuel emulsification system 18 is configured to generate a water fuel emulsion for distribution and combustion in the gas turbine engine 12. The water fuel emulsion is configured to reduce NOx formation in combustion products, reduce soot formation in the combustion products, and generally improve the combustion process in the gas turbine engine 12. Additionally, the water fuel emulsion is configured to reduce a volume of water otherwise supplied to the gas turbine engine 12 separately from the fuel. The disclosed embodiments also are configured to produce the water fuel emulsion in a variety of compositions, such as a water-in-fuel (WIF) emulsion, a fuel-in-water (FIW) emulsion, and/or various ratios of water to fuel to control the combustion process.

The gas turbine engine 12 includes an air intake section 32, a compressor section 34, a primary combustor section 36 having one or more primary combustors 38, and a primary turbine section 40. In certain embodiments, the gas turbine engine 12 may further include (or exclude) a secondary combustor section 42 having one or more secondary combustors 44 and a secondary turbine section 46. The gas turbine engine 12 also includes an exhaust section 48.

The compressor section 34 may be an axial compressor having one or more compressor stages 50, each having a plurality of compressor blades 52 coupled to a central rotor or shaft 54. The compressor blades 52 are driven to rotate by the shaft 54 within a compressor casing 56. The compressor section 34 may include 1 to 28 or more compressor stages 50.

The primary combustor section 36 includes the combustors 38 each having one or more fuel nozzles 58. For example, each combustor 38 may include 1, 2, 3, 4, 5, 6, or more fuel nozzles 58. By further example, each combustor 38 may include a central fuel nozzle 58 surrounded by a plurality of peripheral fuel nozzles 58. The fuel nozzles 58 are primary fuel nozzles disposed in a head end 60 of the primary combustors 38. Additionally, the combustors 38 may include one or more lateral or quaternary fuel injectors or nozzles 62 along a combustor liner or sidewall 64 of the primary combustors 38. The fuel nozzles 58 and 62 are oriented crosswise (e.g., perpendicular or acute angles) relative to one another. For example, the fuel nozzles 58 are oriented in an axial direction relative to a central axis of the primary combustor 38, whereas the fuel nozzles 62 are oriented in a radial direction relative to the central axis. The fuel nozzles 58 and 62 are configured to inject an emulsion of fuel and water into a combustion chamber or zone 66 of the primary combustor 38, such that combustion may occur to generate hot combustion products 96 for delivery to the primary turbine section 40.

The primary turbine section 40 may include one or more turbine stages 68, each having a plurality of turbine blades 70 coupled to a rotor or shaft 72. In operation, the hot combustion products 96 flow through the primary turbine section 40, thereby driving the turbine blades 70 to rotate the shaft 72 within a turbine casing 74. The primary turbine section 40 may include 1 to 10 or more turbine stages 68.

In certain embodiments, such as illustrated in FIG. 1, the gas turbine system 10 may include the secondary combustor section 42 and the secondary turbine section 46. However, some embodiments of the gas turbine system 10 may exclude the secondary combustor section 42 and the secondary turbine section 46. As illustrated, the secondary combustor section 42 includes the one or more secondary combustors 44, each having one or more primary fuel nozzles 76 and one or more lateral or quaternary fuel injectors or nozzles 78. The fuel nozzles 76 and 78 are configured to inject an emulsion of fuel and water into a combustion chamber or zone 80 in the secondary combustors 44, such that combustion occurs, and hot combustion gases 100 are delivered into the secondary turbine section 46.

The secondary turbine section 46 may include one or more turbine stages 82, each having a plurality of turbine blades 84 coupled to a rotor or shaft 86, which are collectively rotatable within a casing 87. For example, the secondary turbine section 46 may include 1 to 5 or more turbine stages 82. In the illustrated embodiment, the shafts 54 and 72 are coupled together via an intermediate shaft 88, and the shafts 72 and 86 are coupled together via an intermediate shaft 90. However, the illustrated shafts 54, 88, 72, 90, and 86 may be integrated together into one or more common shafts. Additionally, the shaft 86 is coupled to the load 14.

In operation, the compressor section 34 is configured to receive air through the air intake section 32 as indicated by arrows 92. The air intake section 32 may include one or more air filters, silencers, anti-ice systems, or other inlet air conditioning systems. The compressor section 34 is configured to compress the intake air 92 via the one or more compressor stages 50, thereby progressively compressing the air prior to delivery into the primary combustor section 36 as illustrated by arrows 94. The compressed air 94 is routed along the combustor liner 64 into the head end 60 of each of the primary combustors 38. In certain embodiments, the compressed air 94 is routed through a flow passage between an exterior surface of the combustor liner 64 and a surrounding flow guide for cooling the combustor liner 64.

The compressed air 94 is then routed into the combustion chamber 66. In certain embodiments, some of the compressed air 94 may be routed around the fuel nozzles 58 and/or fuel nozzles 62. Additionally, some atomizing air (e.g., compressed air) may be routed through the fuel nozzles 58 and/or fuel nozzles 62 to help atomize the fuel. The atomizing air (e.g., compressed air) may be supplied from the compressor section 34, a separate air compressor, or another air supply. In the present discussion, reference will be made to a compressed air (e.g., 94), but it should be understood that the compressed air may originate from one or more air supplies.

The fuel nozzles 58 and/or the fuel nozzles 62 also receive an emulsion of fuel and water from the fluid supply system 16. The emulsion of fuel and water mixes with the compressed air 94 in the combustion chamber 66 and combusts to form hot combustion gases, which then flow into the primary turbine section 40 as illustrated by arrows 96. As discussed in further detail below, the emulsion of water and fuel provided by the fluid supply system 16 is configured to enhance the atomization of fuel in the combustion chamber 66, thereby improving the combustion reaction, reducing NOx formation, reducing soot, and generally improving the combustion process.

The combustion gases 96 flow through the one or more turbine stages 68 in the primary turbine section 40, thereby driving the turbine blades 70 in each of the stages 68 to rotate the shaft 72. The combustion gases eventually exit the primary turbine section 40 as illustrated by arrow 98. At this point, the combustion gases may enter the secondary combustion section 42. Each of the secondary combustors 44 in the secondary combustor section 42 is configured to receive the combustion gases 98 and an emulsion of water and fuel from the fluid supply system 16, which facilitates further combustion of the fuel in the emulsion within the combustion chamber 80 of the secondary combustion section 42. The combustion provides a further output of exhaust gases or combustion products, as indicated by arrows 100. The combustion gases 100 then enter the secondary turbine section 46, and the combustion gases 100 drive the turbine blades 84 to rotate the shaft 86 in the one or more turbine stages 82.

Eventually, the combustion gases exit the secondary turbine section 46 as exhaust gases as indicated by arrow 102. The exhaust gases 102 then flow through the exhaust section 48, which may include an exhaust stack, exhaust treatment systems, silencers, or other equipment. In operation, the combustion gases 96 driving rotation of the primary turbine section 40 and the combustion gases 100 driving rotation of the secondary turbine section 46 are configured to rotate the shafts 72 and 86, thereby driving rotation of the load 14, the compressor section 34, and any other loads or equipment coupled to the gas turbine system 10.

As noted above, the fluid supply system 16 is configured to provide an emulsion of water and fuel to the various fuel nozzles 58, 62, 76, and 78 and the gas turbine engine 12 to improve the combustion reaction, reduce NOx formation, reduce soot formation, and improve the combustion process. In the illustrated embodiment, the water fuel emulsification system 18 may include a plurality of emulsifiers 104 arranged in series and/or parallel relative to one another. For example, the emulsifiers 104 may include a first series of emulsifiers 106 disposed in a series or sequential arrangement, a second series of emulsifiers 108 disposed in a series or sequential arrangement, and a third series of emulsifiers 110 disposed in a series or sequential arrangement, wherein the emulsifiers 106, 108, and 110 are arranged in parallel relative to one another.

These emulsifiers 104 arranged in parallel and in series are configured to provide different levels of emulsification and independent paths of water fuel emulsification for use in various locations throughout the gas turbine engine 12. For example, as discussed in further detail below, different emulsification techniques may be used and/or characteristics of the emulsified water and fuel may be supplied depending on certain operating conditions, injection locations, and so forth.

The water fuel emulsification system 18 is configured to receive one or more fuels from the fuel supply systems 20, as indicated by arrow 117. As illustrated, each of the fuel supply systems 20 includes a fuel supply 112, at least one flow device 114 (e.g., flowmeter, regulator, and/or valve), and at least one pump 116. The fuel supply 112 may include a fuel tank, a pipeline, a reservoir, or another source of fuel. The fuel supply 112 also may include one or more fuel heaters or heat exchangers to control a temperature of the fuel. The fuel may include low grade fuels, highly viscous fuels, heavy fuel oil (HFO), crude oil, diesel fuel, and/or contaminated liquid fuels. However, any fuel may be used in the fuel supply 112.

More specifically, the flow device 114 may include a regulator, a check valve, or a valve (e.g., a gate valve or a ball valve) coupled to an actuator, which may be controlled by the control system 28. In certain embodiments, the flow device 114 may include a flowmeter to monitor the flowrate of the fuel and thus improve control of the percentage or ratio of fuel being mixed with the water and emulsifying agent in the emulsifier 104. The pump 116 may include a pump section and a drive section, wherein the drive section may include a motor or drive (e.g., variable-frequency drive (VFD)) configured to drive the pump section. The VFD may be configured to provide more precise control of the flow rate. The pump section of the pump 116 may include a rotary pump and/or a reciprocating pump.

Again, the fluid supply system 16 may include one or more fuel supply systems 20. Each of these fuel supply systems 20 may be identical or different from the other fuel supply systems 20. Additionally, each of the fuel supplies 112 may be the same or different from the others. For example, one fuel supply 112 may include a crude oil, another fuel supply 112 may include a contaminated liquid fuel, another fuel supply 112 may include a bio-fuel, another fuel supply 112 may include other waste products or poor quality fuels, or any combination thereof. In certain embodiments, each of the fuel supply systems 20 may be configured to supply liquid fuel to only one or a plurality of the emulsifiers 104 in the water fuel emulsification system 18. For example, each fuel supply system 20 may be configured to supply fuel to one of the series of emulsifiers 106, 108, or 110.

The water fuel emulsification system 18 is also configured to receive water from one or more of the water supply systems 22. Each water supply system 22 may include a water supply 118, a flow device 120 (e.g., flowmeter, regulator, and/or valve), and a pump 122. The water supply 118, similar to the fuel supply 112, may include a water tank, a water pipeline, a water reservoir, or another source of water. The water supply 118 also may include one or more water heaters or heat exchangers to control a temperature of the water. The flow device 120 may include a regulator, a check valve, or a valve (e.g., a gate valve or a ball valve) coupled to an actuator, which may be controlled by the control system 28. In certain embodiments, the flow device 120 may include a flowmeter to monitor the flowrate of the water and thus improve control of the percentage or ratio of water being mixed with the fuel and emulsifying agent in the emulsifier 104. The pump 122 may include a pump section and a drive section, wherein the drive section may include a motor or drive (e.g., variable-frequency drive (VFD)) configured to drive the pump section. The VFD may be configured to provide more precise control of the flow rate. The pump section of the pump 122 may include a rotary pump, a reciprocating pump, or any combination of pumps. The water supply system 22 supplies one or more streams or flows of water to the water fuel emulsification system 18, as illustrated by arrow 124.

The water fuel emulsification system 18 also may include the one or more emulsifying agent supply systems 24. Each of the emulsifying agent supply systems 24 may include an emulsifying agent supply 126, at least one flow device 128 (e.g., flowmeter, regulator, and/or valve), and at least one pump 130. The agent supply 126 may include an agent supply tank, an agent supply reservoir, or another suitable agent supply storage medium. The agent supply 126 also may include one or more heaters or heat exchangers to control a temperature of the emulsifying agent. The flow device 128 may include a regulator, a check valve, or a valve (e.g., a gate valve or a ball valve) coupled to an actuator, which may be controlled by the control system 28. In certain embodiments, the flow device 128 may include a flowmeter to monitor the flowrate of the emulsifying agent and thus improve control of the percentage or ratio of emulsifying agent being mixed with the water and fuel in the emulsifier 104. The pump 130 may include a pump section and a drive section, wherein the drive section may include a motor or drive (e.g., variable-frequency drive (VFD)) configured to drive the pump section. The VFD may be configured to provide more precise control of the flow rate. The pump section of the pump 130 may include a reciprocating pump and/or a rotary pump.

Each emulsifying agent supply system 24 is configured to supply an emulsifying agent to the water fuel emulsification system 18, as indicated by arrow 132. In certain embodiments, a single emulsifying agent supply system 24 may be configured to supply an emulsifying agent to all of the emulsifiers 104, or each emulsifying agent supply system 24 may be configured to supply an emulsifying agent to one or more of the emulsifiers 104, such as the series of emulsifiers 106, 108, or 110. In operation, each emulsifier 104 is configured to receive fuel from the fuel supply system 20 and water from the water supply system 22. Additionally, depending on the operational mode, sensor feedback, and control input, the water fuel emulsification system 18 may be configured to receive one or more emulsifying agents from the emulsifying agent supply system 24.

The water fuel emulsification system 18 is configured to provide a variety of different types and compositions of water fuel emulsions. The controller 152 may be configured to control generation of the water fuel emulsion to generate a plurality of different water fuel emulsions, including a water-in-fuel (WIF) emulsion or a fuel-in-water (FIW) emulsion. The plurality of different water fuel emulsions may include different fuels or fuel percentages, different emulsifying agents or emulsifying agent percentages, different water percentages, or a combination thereof. Additionally, the plurality of different water fuel emulsions may include different sizes of the plurality of water droplets dispersed in the fuel (e.g., WIF emulsion) and/or different sizes of the plurality of fuel droplets dispersed in the water (e.g., FIW emulsion). For example, the different sizes of water droplets dispersed in fuel and/or fuel droplets dispersed in water may be less than approximately 5, 10, 15, or 20 microns as an average diameter of the droplets. In certain embodiments, the water fuel emulsification system 18 and the fluid supply system 16 may be controlled by the control system 28 (e.g., the controller 152) to provide a water fuel emulsion in different ratios or percentages of water, fuel, and emulsifying agent, different types of emulsions (e.g., a water-in-fuel [WIF] emulsion or a fuel-in-water [FIW] emulsion), different fuels, different emulsifying agents, or different mixtures of fuel, emulsifying agent, and water.

The fuel, water, and emulsifying agents may be mixed in a variety of ways to generate the water fuel emulsions. For example, one of the emulsifiers 104 may be configured to mix fuel from one of the fuel supply systems 20 with water from one of the water supply systems 22 without an emulsifying agent from the emulsifying agent supply systems 24, while another emulsifier 104 may be configured to mix fuel from one of the fuel supply systems 20, water from one of the water supply systems 22 and an emulsifying agent from one of the emulsifying agent supply systems 24. As a further example, one of the emulsifiers 104 may be configured to provide a larger amount of fuel relative to water to facilitate a water-in-fuel (WIF) emulsion, while another one of the emulsifiers 104 may be configured to provide a greater amount of water relative to fuel to produce a fuel-in-water (FIW) emulsion. As a further example, one of the emulsifiers 104 may be configured with control parameters to mix a crude oil with water and an emulsifying agent, while another one of the emulsifiers 104 may be configured to mix a contaminated liquid fuel or bio-fuel with water and an emulsifying agent.

The following examples may correspond to compositions of the water fuel emulsions resulting in WIF and FIW emulsions. For example, the controller 152 may be configured to control the relative amounts of water, fuel, and emulsifying agent supplied to the emulsifier 104 of the water fuel emulsification system 18 to generate the WIF emulsion with a first composition having a first percentage of the water, a first percentage of the fuel greater than the first percentage of the water, and a first percentage of the emulsifying agent equal to zero. In this example, the first percentage of the water may be 1 to 10, 2 to 8, 3 to 7, or about 5 percent, and the remainder of the first composition may correspond to the fuel (e.g., first percentage of the fuel may be 90 to 99, 92 to 98, 93 to 97, or about 95 percent).

As another example, the controller 152 may be configured to control the relative amounts of water, fuel, and emulsifying agent supplied to the emulsifier 104 to generate the WIF emulsion with a second composition having a second percentage of the water greater than the first percentage of the water, a second percentage of the fuel greater than the second percentage of the water and less than the first percentage of the fuel, and a second percentage of the emulsifying agent greater than zero. In this example, the second percentage of the water may be 20 to 30 percent, and the remainder of the second composition may correspond to the fuel and the emulsifying agent (e.g., second percentage of the fuel may be 65 to 79 percent and second percentage of emulsifying agent may be 1 to 5 percent).

The controller 152 also may be configured to control the relative amounts of water, fuel, and emulsifying agent supplied to the emulsifier 104 to generate a fuel-in-water (FIW) emulsion with a third composition having a third percentage of the water greater than the first percentage of the water, a third percentage of the fuel greater than the third percentage of the water and less than the first percentage of the fuel, and a third percentage of the emulsifying agent equal to zero. In this example, the third percentage of the water may be 30 to 50 percent, and the remainder of the second composition may correspond to the fuel (e.g., third percentage of the fuel may be 50 to 70 percent).

Accordingly, the water fuel emulsification system 18 may use different emulsifiers 104 to provide different types of emulsions; different ratios of water, fuel, and, optionally, emulsifying agent; and different compositions based on different fuels and/or emulsifying agents. In certain embodiments, the water fuel emulsification system 18 may be configured to vary parameters of the water fuel emulsion depending on operational conditions of the gas turbine engine 12, such as a start-up condition, a steady state condition, a transient condition, a part-load condition, a full-load condition, different emissions requirements, different environmental conditions, different fuel compositions or qualities, and so forth.

The water fuel emulsion generated by the water fuel emulsification system 18 can be distributed throughout the gas turbine engine 12 via the emulsion distribution system 26. As illustrated, the emulsion distribution system 26 may include one or more fluid distribution manifolds 134, one or more valves 136, and one or more fluid flow dividers or combiners 138. For example, each manifold 134 may be configured to distribute an input flow into a plurality of output flows; the valves 136 may include check valves, gate valves, ball valves or other actuatable valves; and the flow dividers or combiners 138 may be configured to split or combine fluid flows of the water fuel emulsion.

The emulsion distribution system 26 may be fluidly coupled to the gas turbine engine 12 via one or more emulsion distribution lines or conduits 140. For example, in certain embodiments, a single line may be fluidly coupled to all of the fuel nozzles 58, 62, 76, and 78. However, in some embodiments, a plurality of fuel circuits may be used to control and distribute the emulsion to the various fuel nozzles 58, 62, 76, and 78. For example, each of the conduits 140 may be coupled to one or more subsets of the fuel nozzles 58, 62, 76, and 78. In certain embodiments, the fuel nozzles 58 may include a primary or central fuel nozzle and secondary or peripheral fuel nozzles. Accordingly, the conduits 140 may be coupled to central fuel nozzles 58 via a first fuel circuit or conduit 142 and independently to peripheral or secondary fuel nozzles 58 via a second fuel fluid circuit or conduit 144. The conduits 140 also may include independent conduits 146 coupled to the lateral fuel nozzle 62, independent conduits 148 coupled to the fuel nozzle 76, and independent fuel conduits 150 coupled to the lateral fuel nozzle 78. In certain embodiments, each of these independent conduits 142, 144, 146, 148, and 150 may include an actuatable valve coupled to the control system 28 to provide independent control of the flows to the respective fuel nozzles 58, 62, 76, and 78. Accordingly, the flows of water fuel emulsions to each of these fuel nozzles 58, 62, 76, 78 may be controlled to improve combustion, reduce NOx formation, reduce soot formation, and control the overall combustion process.

The gas turbine engine 12 and the fluid supply system 16 may be controlled and monitored by the control system 28 and the monitoring system 30. The control system 28 may include one or more controllers 152, each having one or more processors 154, memory 156, and instructions 158 stored on the memory 156 and executable by the processors 154. For example, the controllers 152 may include various controls for operating the gas turbine engine 12, the water fuel emulsification system 18, distribution of the emulsion through the emulsion distribution system 26, fuel supply through the fuel supply system 20, water supply through the water supply system 22, and emulsifying agent supply through the emulsifying agent supply system 24. The monitoring system 30 may include a variety of monitoring functions or sub-systems.

As illustrated, the monitoring system 30 includes a sensor feedback acquisition system 160, which may include a turbine monitor 162, an emulsion monitor 164, a supply monitor 166, and a distribution monitor 168. The monitoring system 30 is also communicatively coupled to various sensors 170 distributed throughout the gas turbine system 10. The sensors 170 (designated in FIGS. 1-3 with an S) are communicatively coupled to the monitoring system 30 via one or more monitoring or communication lines 172. As illustrated, the sensors 170 are coupled to one or more locations along the compressor section 34, the primary combustors 38, the primary turbine section 40, the secondary combustors 44, the secondary turbine section 46, the load 14, the water fuel emulsification system 18, the fuel supply systems 20, the water supply systems 22, the emulsifying agent supply system 24, and the emulsion distribution system 26. These sensors 170 may include temperature sensors, pressure sensors, flow sensors, vibration sensors, exhaust emissions sensors, combustion dynamics or compositions sensors, fluid composition sensors, leak sensors, or any combination thereof. The sensors 170 provide sensor feedback to the monitoring system 30, which then uses the sensor feedback to facilitate the various monitors (or monitoring functions) 162, 164, 166, and 168.

The monitors 162, 164, 166, and 168 monitor the gas turbine system 10 to facilitate control functions of the control system 28. The turbine monitor 162 is configured to monitor operational characteristics of the gas turbine engine 12, such as a start-up condition, a steady state condition, transient conditions, a part load or full load condition, combustion dynamics, exhaust emissions in the combustion products, flame temperature of combustion, or any other suitable parameter that may be used to facilitate control via the control system 28. The monitored exhaust emissions may include nitrogen oxides (NOx), soot, carbon dioxide ($CO_2$), carbon monoxide (CO), and sulfur oxides (SOx).

The emulsion monitor 164 may be configured to monitor aspects of the water fuel emulsification system 18, such as ratios of fuel, water, and emulsifying agent, characteristics or types of water fuel emulsions (e.g., WIF or FIW emulsions), pressure of the fluid supplies or emulsion, or any other characteristics. The supply monitor 166 may be specifically configured to monitor the fuel supply system 20, the water supply system 22, and the emulsifying agent supply system 24. For example, the supply monitor 166 may be configured to monitor the quantity or level of the fluid supplies (e.g., 112, 118, 126), the supply pressures, the supply flow rates, the supply temperatures, potential leaks, or other characteristics of the fluid flows (e.g., 117, 124, 132) from the fluid supply system 16 (e.g., 20, 22, 24) to the water fuel emulsification system 18.

The distribution monitor 168 is configured to monitor the distribution of the water fuel emulsion through the emulsion distribution system 26. Accordingly, the distribution monitor 168 may monitor fluid pressures, fluid flow rates, temperatures, leaks, compositions of the emulsion, or other characteristics impacting the distribution of the emulsion to the various fuel nozzles 58, 62, 76, and 78. Altogether, the various monitors 162, 164, 166, and 168 help the control system 28 to control operation of the gas turbine engine 12, control generation and distribution of the water fuel emulsions, and control the combustion reaction and emissions levels in the combustor chambers 66 and 80.

Figure 2:
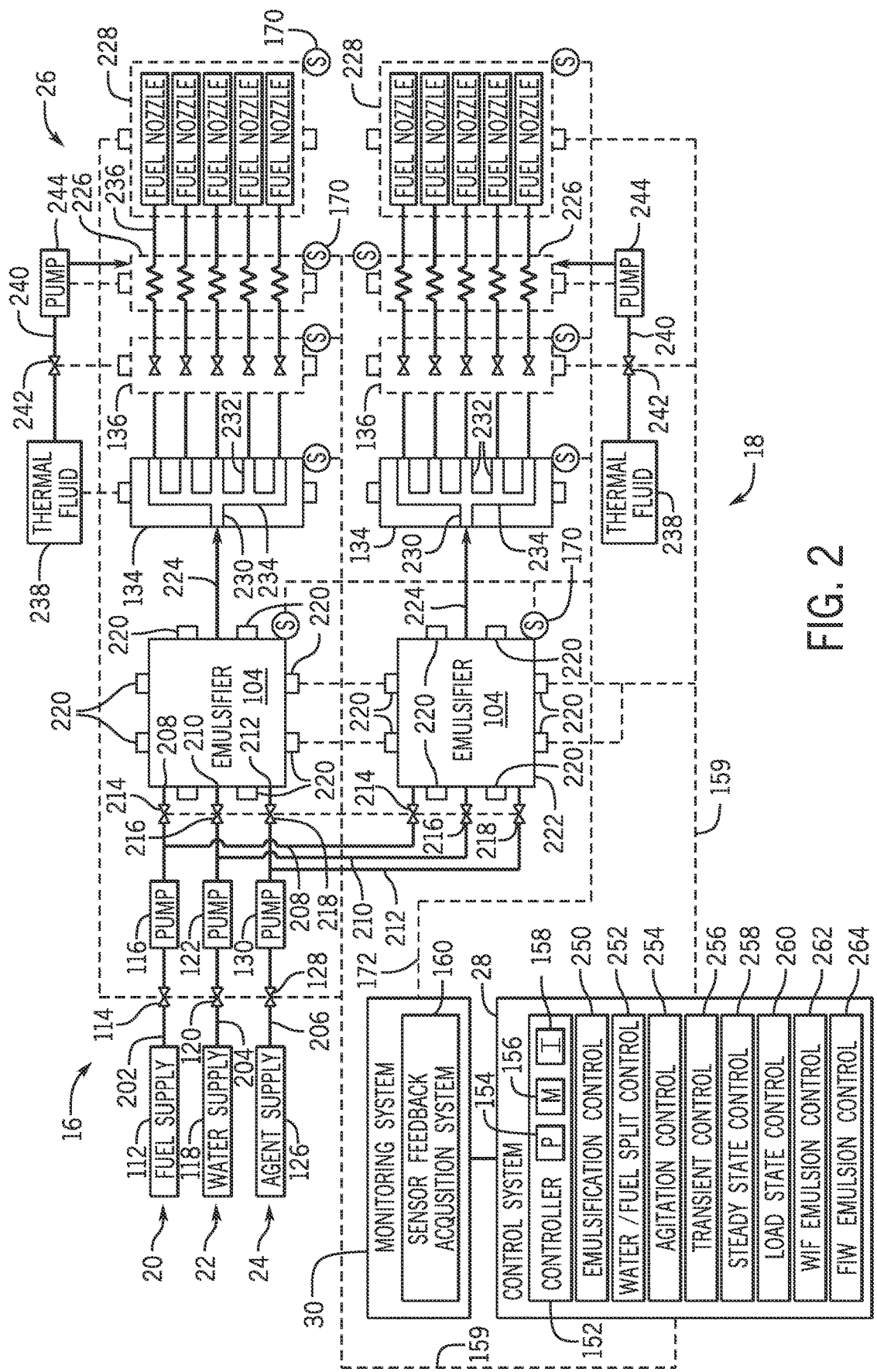
FIG. 2 is a schematic of an embodiment of the water fuel emulsification system of FIG. 1.

FIG. 2 is a schematic of an embodiment of a portion of the water fuel emulsification system 18 having a plurality of emulsifiers 104. As illustrated, the water fuel emulsification system 18 has one of the fuel supply systems 20, one of the water supply systems 22, and one of the emulsifying agent supply systems 24 coupled to the emulsifiers 104. The fuel supply 112, the flow device 114, and the pump 116 of the fuel supply system 20 are fluidly coupled to the emulsifiers 104. Similarly, the water supply 118, the flow device 120, and the pump 122 of the water supply system 22 are fluidly coupled to the emulsifiers 104. The agent supply 126, the flow device 128, and the pump 130 of the emulsifying agent supply system 24 are fluidly coupled to the emulsifiers 104. Although only one of each supply system 20, 22, and 24 is shown in the embodiment of FIG. 2, two or more of the supply systems may be included to provide more flexibility in fluid supplies and independent controls and distributions of emulsions to the various fuel nozzles. As illustrated, the emulsifier 104 receives the fuel, water, and agent through respective lines or conduits 202, 204, and 206, respectively. Each emulsifier 104 may be coupled to the lines or conduits 202, 204, and 206 via branch lines 208, 210, and 212 having valves 214, 216, and 218, respectively. Accordingly, the valves 214, 216, and 218 may be configured to help control the distribution and flows of the fuel, water, and agent to each of the emulsifiers 104.

Each of the emulsifiers 104 is configured to emulsify the fuel and water with or without the use of the emulsifying agent. Each of the emulsifiers 104 may include one or more emulsifying inducers or agitators 220 disposed about or within a body or housing 222 of the emulsifier 104. The agitators 220 may include mechanical structures, such as stationary screens, protrusions, recesses, or other features configured to mix the fluids. The agitators 220 may include rotating blades or impellers, vibration inducers, acoustic agitators, impinging flows of the different fluids, or any combination thereof. Each of the emulsifiers 104 may be configured to operate independently from the other emulsifiers 104, such that the emulsifiers 104 may be configured to provide different emulsions of water, fuel, and emulsifying agent. Regardless, each emulsifier 104 is configured to output a water fuel emulsion as indicated by arrow 224. The water fuel emulsification system 18 is configured to route the emulsion 224 to the emulsion distribution system 26.

As illustrated, the emulsion distribution system 26 includes manifolds 134, valves 136, and heat exchangers 226 between the emulsifiers 104 and the fuel nozzles 228. Each manifold 134 includes at least one fluid inlet passage 230, a plurality of fluid outlet passages 232, and a common or joining passage 234 between the passages 230 and 232. Each of the outlet passages 232 is fluidly coupled to one of the valves 136 and one of the heat exchangers 226 along an outlet or distribution conduit 236 extending between the manifold 134 and one of the fuel nozzles 228. The valve 136 is configured to selectively open and close the fluid flow of the water fuel emulsion to the respective fuel nozzle 228.

The heat exchanger 226 is configured to exchange heat with a thermal fluid 238 (e.g., water) fluidly coupled to the heat exchanger 226 via a heat exchange circuit 240 having a valve 242 and a pump 244. The valve 242 is configured to open and close to enable or disable flow of the thermal fluid 238 through the heat exchange circuit 240, while the pump 244 is configured to force a flow of the thermal fluid 238 through the heat exchange circuit 240 to exchange heat with one or more of the heat exchangers 226 or with each of the heat exchangers 226. For example, the thermal fluid 238 may be hotter than the water fuel emulsion, thereby transferring heat to the water fuel emulsion before delivery to the fuel nozzle 228. However, in certain embodiments, the thermal fluid 238 may be cooler than the water fuel emulsion, thereby facilitating heat transfer away from the emulsion into the thermal fluid 238 in the heat exchanger 226. The control system 28 may be configured to control the valve 242 and the pump 244 to selectively control the heat exchange between the water fuel emulsion and the thermal fluid 238 as desired to control the temperature of the emulsion prior to entry into the fuel nozzle 228.

Each fuel nozzle 228 (e.g., 58, 62, 76, 78) is configured to inject the water fuel emulsion into a combustion chamber (e.g., 66, 80) as discussed above. In the illustrated embodiment, the water fuel emulsification system 18 has multiple series of the emulsifiers 104, the manifolds 134, the valves 136, the heat exchangers 226, and the fuel nozzles 228. For example, the water fuel emulsion system 18 may include 1, 2, 3, 4, 5, 6, 7, 8, 9, 10 or more of these series for emulsification of water and fuel for delivery into various fuel nozzles 228. In certain embodiments, each series of the emulsifier 104, manifold 134, valves 136, heat exchangers 226, and fuel nozzles 228 may be associated with a single combustor (e.g., 66, 80) or combustion section (e.g., 36, 42), multiple combustors (e.g., 66, 80) or combustion sections (e.g., 36, 42), one or more fuel circuits, or any combination thereof. For example, each series may be associated with a primary fuel circuit, a secondary fuel circuit, and so forth. In some embodiments, each series may correspond to a different gas turbine engine 12, such that each series is distributing an emulsion of fuel and water to a different gas turbine engine 12 coupled to a load 14 in a power plant or other facility.

Similar to FIG. 1, the water fuel emulsification system 18 of FIG. 2 has the monitoring system 30 coupled to various sensors 170 at the emulsifiers 104, the manifolds 134, the valves 136, the heat exchangers 226, and the fuel nozzles 228. The sensors 170 (indicated by the letter "S") are coupled to the monitoring system 30 via one or more communication lines 172. Additionally, the control system 28 is communicatively coupled to the water fuel emulsification system 18 via one or more control lines 159. For example, the control system 28 is communicatively coupled to the flow devices 114, 120, 128, the valves 214, 216, and 218, the pumps 116, 122, and 130, the valves 136, and other equipment throughout the water fuel emulsification system 18.

The control system 28 may include a variety of controls to facilitate operation of the water fuel emulsification system 18. For example, the controller 152 may be programmed with an emulsification control 250, a water/fuel split control 252, an agitation control 254, a transient operation control 256, a steady state operation control 258, a load state control 260, a water-in-fuel (WIF) emulsion control 262, and a fuel-in-water (WIF) emulsion control 264. Each of these controls 250, 252, 254, 256, 258, 260, 262, and 264 is configured to change characteristics of the water fuel emulsification system 18, thereby changing one or more characteristics of the water fuel emulsion 224 provided to the fuel nozzles 228 depending on various sensor feedback from the sensors 170, user input, or operational conditions.

The controls 250, 252, 254, 262, and 264 may be configured to vary aspects of the emulsification process in the emulsifiers 104. The emulsification control 250 may be configured to control various aspects of the emulsifiers 104 and the fluid supplies 20, 22, and 24, thereby helping to control the emulsification process and composition of the water fuel emulsion. The water/fuel split control 252 may be configured to control ratios of the water, the fuel, and the emulsifying agent from the fluid supplies 20, 22, and 24 into the emulsifiers 104, thereby helping to control the composition of the water fuel emulsion 224. The agitation control 254 may be configured to control each of the emulsifying inducers or agitators 220, such as controlling a position, speed, intensity, or other characteristic of the agitators 220. The controls 262 and 264 may be configured to vary aspects of the water fuel emulsification system 18 depending on the desired type of emulsion. The water-in-fuel (WIF) emulsion control 262 is configured to adjust or change characteristics of the water fuel emulsification system 18, such that water is encapsulated inside of fuel as a water-in-fuel (WIF) emulsion. In contrast, the fuel-in-water (FIW) emulsion control 264 is configured to adjust or change characteristics of the water fuel emulsification system 18, thereby providing a fuel-in-water (FIW) emulsion. These controls 250, 252, 254, 262, and 264 are configured to operate independently and/or cooperatively to adjust the water fuel emulsion 224.

The controls 256, 258, and 260 may be configured to vary aspects of the water fuel emulsification system 18 depending on operational conditions and loads of the gas turbine system 10. For example, the transient operation control 256 may be configured to control or change aspects of the water fuel emulsification system 18 during transient operational conditions of the water fuel emulsification system 18 and/or the gas turbine engine 12, such as a start-up condition, a shut-down condition, or generally unstable conditions during operation. The steady state operation control 258 may be configured to adjust or change characteristics of the water fuel emulsification system 18 during steady state conditions of the water fuel emulsification system 18 and/or the gas turbine engine 12, such as relatively continuous or stable conditions in between start-up and shut-down conditions. The load state control 260 may be configured to adjust characteristics of the water fuel emulsification system 18 depending on a load state of the gas turbine engine 12, such as a full load condition or part load condition. Accordingly, the water fuel emulsification system 18 may adjust or change characteristics of the water fuel emulsion depending on the load. These controls 256, 258, and 260 are configured to operate independently and/or cooperatively with the controls 250, 252, 254, 262, and 264 to adjust the water fuel emulsion 224.

Figure 3:
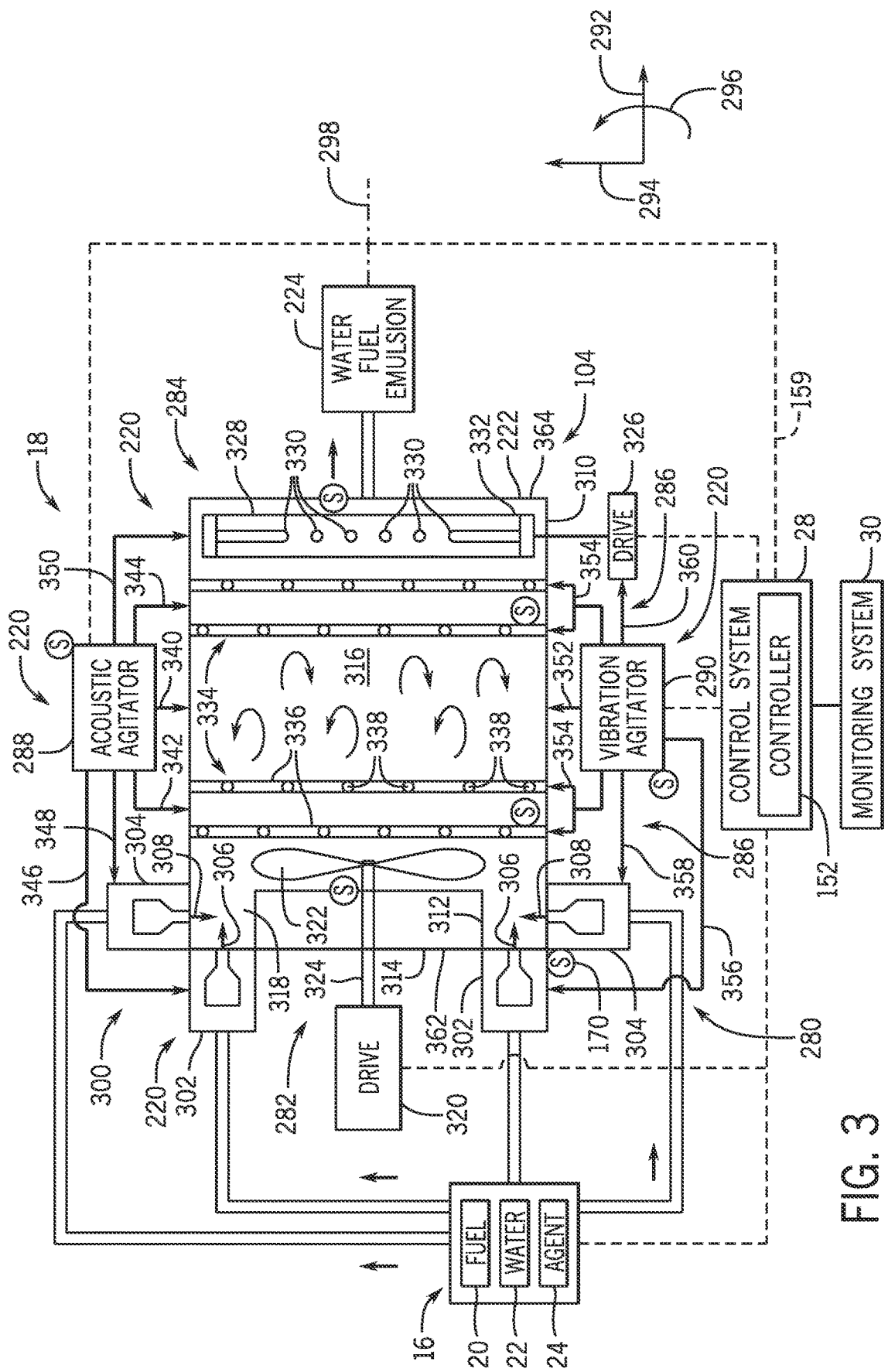
FIG. 3 is a schematic of an embodiment of an emulsifier of the water fuel emulsification system of FIGS. 1 and 2, further illustrating a plurality of agitators to facilitate emulsion of fuel and water.

FIG. 3 is a schematic of an embodiment of the water fuel emulsion system 18, illustrating the emulsifier 104 having a plurality of different types of emulsifying inducers or agitators 220. As illustrated, the agitators 220 are coupled to and may extend into the body 222 of the emulsifier 104. For example, the agitators 220 include a fluid impingement agitator 280, a rotary agitator 282, a rotary agitator 284, a stationary agitator 286, an acoustic agitator 288, a vibration agitator 290, or any combination of these agitators integrated together into a common unit. For purposes of discussion, reference may be made to an axial direction or axis 292, a radial direction or axis 294, and a circumferential direction or axis 296 extending about the axial direction or axis 292. Each of these axes or directions 292, 294, and 296 are relative to a longitudinal axis 298 of the emulsifier 104. The agitators 220 are coupled to various sides of the body 222, in various orientations relative to the longitudinal axis 298, and through an interior 316 of the body 222.

The fluid impingement agitator 280 includes a plurality of fluid injectors or nozzles 300 configured to inject the fuel 20, the water 22, and the agent 24 into the body 222 of the emulsifier 104 to facilitate mixing of the different fluids. As illustrated, the fluid injectors 300 include fluid injectors 302 and fluid injectors 304 orientated crosswise (e.g., perpendicular or at acute angles) relative to one another to facilitate mixing of the fluids. For example, the fluid injectors 302 may be oriented along the axial direction 292, whereas the fluid injectors 304 may be oriented along the radial direction 294. In some embodiments, the fluid injectors 302 and/or 304 may be oriented at an angle to facilitate a swirling flow about the longitudinal axis 298 of the emulsifier 104. For example, the fuel injectors 302 may be oriented generally along the axial direction 292 with a slight angle (e.g., 5, 10, 15, 20, 25, or 30 degrees relative to the longitudinal axis 298) in the circumferential direction 296, such as in a clockwise or counter-clockwise direction about the longitudinal axis 298. Similarly, the fluid injectors 304 may be oriented generally in the radial direction 294 with an angle about the longitudinal axis 298, such that the fluid injectors 304 are directing the fluid flows in the circumferential direction 296. In certain embodiments, the fluid injectors 302 and 304 are configured to impinge fluid flows directly against one another, as indicated by arrows 306 and 308 representing streams of injected fluids.

The streams of injected fluids 306 and 308 also may be restricted between an outer sidewall 310 of the body 222 of the emulsifier 104 and an outer sidewall 312 of a central hub 314 disposed within the interior 316 of the body 222. Accordingly, the sidewalls 310 and 312 may define a restricted cavity or flow path 318 to further enhance the mixing between the fluid streams 306 and 308. For example, the restricted flow path 318 may be an annular flow path extending about the hub 314 and extending in the axial direction 292. The fluid impingement agitator 280 is configured to enhance mixing and emulsification of the fuel 20 with the water 22 and optionally the agent 24 in this restricted flow path 318. In certain embodiments, the hub 314 also may be configured to move rotationally, along with other aspects of the rotary agitator 282.

The rotary agitator 282 includes a drive 320 coupled to a rotating propeller 322 via a shaft 324. In operation, the drive 320 is configured to rotate the propeller 322 via the shaft 324 to facilitate mixing of the fuel 20, the water 22, and optionally the agent 24 within the interior 316 of the emulsifier 104, thereby helping to promote emulsification. The propeller 322 may have a diameter equal to, less than, or greater than the outer diameter of the hub 314. Accordingly, the propeller 322 may extend partially across the restricted flow path 318 in the radial direction 294. The drive 320 may include an electric motor or drive, a hydraulic motor or drive, a pneumatic motor or drive, or any other suitable motor or drive. The drive 320 also may be configured to move the propeller 322 and shaft 324 in an axial direction 292 along the longitudinal axis 298 to facilitate mixing, such as reciprocating the propeller 322 and shaft 324 at a certain frequency.

The rotary agitator 284 includes a drive 326 coupled to a rotary hub 328, which may include a plurality of radial protrusions or spokes 330 extending inwardly from an annular outer wall 332. The drive 326 is configured to rotate the annular wall 332 having the plurality of radial protrusions 330, thereby facilitating mixing and improving the emulsification of the fuel 20, the water 22, and optionally the agent 24. In certain embodiments, the outer annular wall 332 may be sealed along the outer sidewall 310 of the body 222, such that the drive 326 can directly rotate the annular outer wall 332 along an exterior of the emulsifier 104. However, in certain embodiments, the drive 326 may facilitate rotation of the annular outer wall 332 via another drive technique, such as a belt or chain-driven assembly coupled to the rotary hub 328. Additionally, the drive 326 may be configured to move the rotary hub 328 back and forth in the axial direction 292 and/or the radial direction 294 at a certain frequency to facilitate additional mixing. Similar to the drive 320, the drive 326 may include an electric motor or drive, a hydraulic motor or drive, a pneumatic motor or drive, or another suitable motor or drive.

The stationary agitators 286 may include one or more screens 334 having a mesh of a plurality of wires or lines 336 extending in a first direction across the interior 316 and a plurality of second wires or lines 338 extending in a second direction across the interior 316, wherein the wires or lines 336 and 338 extend crosswise to one another. For example, the lines 336 and 338 may be oriented perpendicular to one another to define a mesh across the interior 316. In some embodiments, the lines 336 and 338 may be staggered from one screen 334 to another. As illustrated, the stationary agitators 286 having the screens 334 may be disposed at a plurality of locations within the interior 316, such as downstream from the rotary agitator 282 and upstream from the rotary agitator 284. However, embodiments of the emulsifier 104 may have one or more sets of the stationary agitators 286 with screens 334 at various locations.

The acoustic agitator 288 is configured to provide acoustic or sonic energy into one or more locations of the emulsifier 104, such as the outer sidewall 310 of the body 222 as indicated by arrows 340, 342 and 344, into the fluid injectors 302 and 304 of the fluid impingement agitator 280 as indicated by arrows 346 and 348, into one or both of the rotary agitators 282 and 284 as indicated by arrow 350, or any other location directly at the emulsifier 104, at the various agitators 220, upstream from the emulsifier 104, and/or downstream from the emulsifier 104. The acoustic agitator 288 is configured to provide acoustic or sonic energy in the form of soundwaves (for example, ultrasonic energy). Accordingly, the acoustic agitator 288 may include an ultrasonic agitator configured to provide ultrasonic waves into the various locations of the emulsifier 104. The ultrasonic energy is configured to help mix and emulsify the fuel 20, the water 22, and optionally the agent 24.

The vibration agitator 290 is configured to provide vibrational energy at various locations of the emulsifier 104. For example, the vibration agitator 290 may apply vibrational energy to the outer sidewall 310 of the emulsifier 104 as indicated by arrow 352, to one or more of the screens 334 of the stationary agitators 286 as indicated by arrows 354, to one or more of the fluid injectors 302 and 304 of the fluid impingement agitator 280 as indicated by arrows 356 and 358, or to one or both of the rotary agitators 282 and 284 as indicated by arrow 360. The vibrational energy is configured to help induce mixing and emulsification of the fuel 20 with the water 22 and optionally the agent 24. The vibration agitator 290 may be disposed at one or more locations about the emulsifier 104, such as circumferentially about the outer sidewall 310 or along one or both of opposite end walls 362 and 364 of the body 222 of the emulsifier 104.

The agitators 220 illustrated in FIG. 3 may be used in any combination, orientation, or sequence relative to one another in each of the emulsifiers 104. For example, if the emulsion system 18 includes emulsifiers 104 in a plurality of series 106, 108, and 110 that are parallel to one another as indicated by FIG. 1, each of these emulsifiers 104 may have one or more of the agitators 220 in different arrangements or the same arrangement relative to one another. Accordingly, multiple stages of the agitators 220 may be used for the different emulsifiers 104. In certain embodiments, the fluid impingement agitator 280 may inject the fuel 20, the water 22, and optionally the agent 24 in one or both of the fluid injectors 302 and 304. For example, the fluid injectors 302 may be used only for injection of the fuel 20, the water 22, or the agent 24, or a combination of two or all of these fluids. Similarly, the fluid injectors 304 may be used to inject only the fuel 20, the water 22, or the agent 24, or these fluid injectors 304 may be used for two or all of these fluids. Additionally, the fluid injectors 302 and 304 may be configured such that the fuel 20 and the water 22 are paired such that the streams 306 and 308 correspond to streams of the fuel 20 and the water 22.

The controller 152 is configured to control each of the illustrated agitators 220 via the control line 159 coupled to each respective agitator 220. The controller 152 also may be responsive to sensor feedback from the monitoring system 30 as discussed above. The monitoring system 30 is communicatively coupled to the control system 28 and various sensors 170 distributed throughout the emulsifier 104. For example, one or more sensors 170 may be coupled to each of the agitators 220. The sensors 170 may be configured to monitor operation of these agitators 220 and/or interior conditions within the emulsifier 104.

Figure 4:
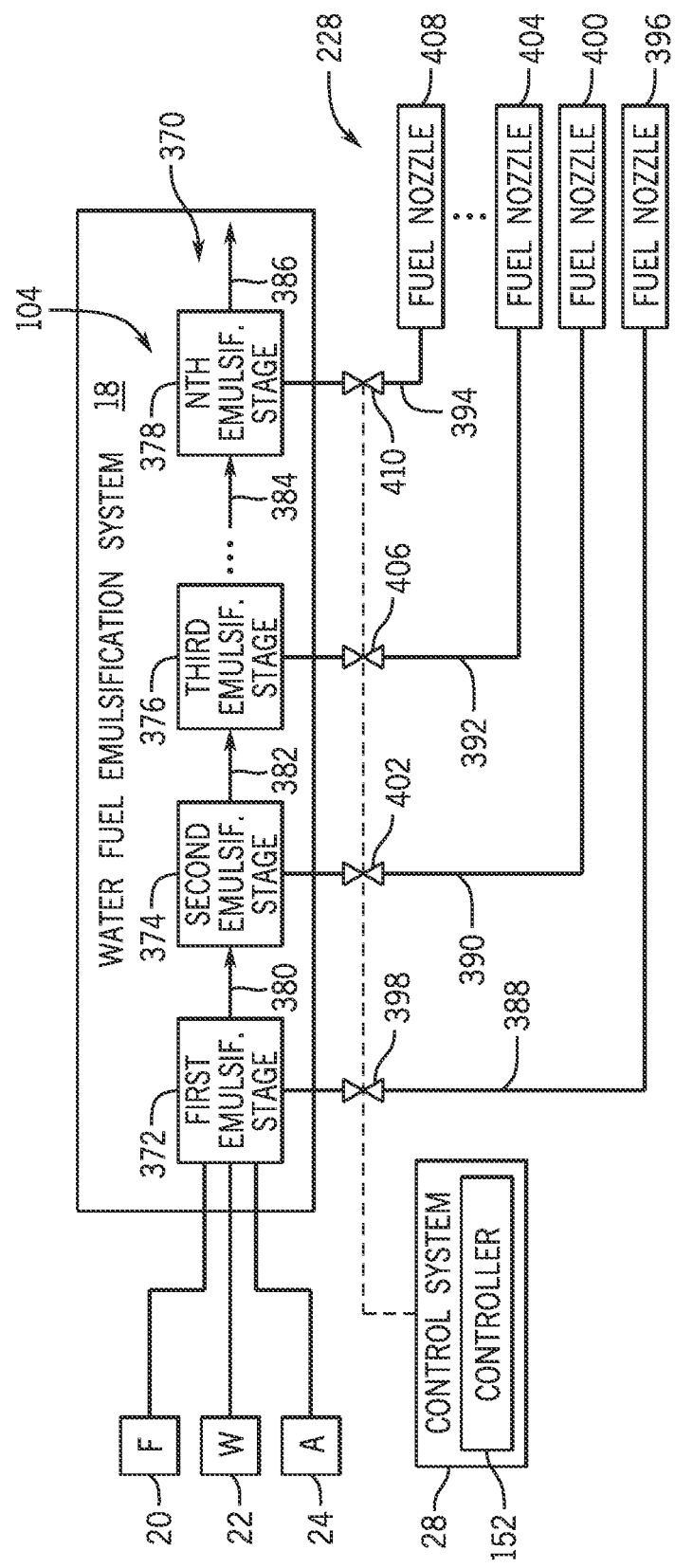
FIG. 4 is a schematic of an embodiment of the water fuel emulsification system of FIGS. 1-3, further illustrating a plurality of emulsification stages and extraction conduits for respective fuel nozzles.

FIG. 4 is a schematic of an embodiment of the water fuel emulsification system 18 having a plurality of emulsification stages 370, including a first emulsification stage 372, a second emulsification stage 374, a third emulsification stage 376, and a series of additional emulsification stages leading up to an Nth emulsification stage 378. Each of the emulsification stages 370 may include one or more of the agitators 220 as discussed above, such as described with reference to FIG. 3. For example, the first emulsification stage 372 may include the fluid impingement agitator 280, the second emulsification stage 374 may include the rotary agitator 282, and the third emulsification stage 376 may include the stationary agitator 286. Another emulsification stage may include the acoustic agitator 288, the vibration agitator 290, the stationary agitator 286, and/or the rotary agitator 284. Accordingly, the emulsification stages 370 may continue with one or more of the same or different agitators 220 leading up to the Nth emulsification stage 378. In certain embodiments, each of the emulsification stages 370 may include one or more of the same agitators 220 as a preceding or subsequent emulsification stage 370.

The sequence of emulsification stages 370 may gradually change the characteristics of a water fuel emulsion 224. For example, the first emulsification stage 372 may produce a water fuel emulsion 380 with first characteristics, the second emulsification stage 374 may product a water fuel emulsion 382 with second characteristics, the third emulsification stage 376 may produce a water fuel emulsion 384 with third characteristics, and so on until the Nth emulsification stage 378 produces a water fuel emulsion 386 with Nth characteristics. The characteristics of the different water fuel emulsions 380, 382, 384, and 386 may include different droplet sizes disposed in the carrier fluid, different ratios between fuel, water, and the agent, different types of water fuel emulsions, different overall compositions, or any combination thereof. For example, the different types of water fuel emulsions may include a fuel-in-water (FIW) emulsion having droplets of fuel carried in a continuous or main flow of water, or the water fuel emulsion may include a water-in-fuel (WIF) emulsion having droplets of water disposed in a main flow of fuel. In certain embodiments, the different droplet sizes, which may apply to either fuel droplets or water droplets depending on the type of water fuel emulsion, may gradually decrease from one stage to another in the emulsification stages 370. The ratios of the fuel, water, and agents also may be varied in percent by mass of these different fluids. The different compositions in the water fuel emulsions also may correspond to different agents being used in the different emulsions, or different agents being added in subsequent stages 370. The different compositions also may include different fuels in the water fuel emulsion, or different fuels being added in subsequent stages 370.

Accordingly, the water fuel emulsification system 18 produces the water fuel emulsions 380, 382, 384, and 386 with potentially different characteristics, which can then be extracted at different points along different extraction conduits as indicated by conduits 388, 390, 392, 394. The conduit 388 extends from the first emulsification stage 372 to a first fuel nozzle 396 and includes a valve 398 coupled to the control system 28 to enable selective control of the flow of the water fuel emulsion 380 to the first fuel nozzle 396. Similarly, the conduit 390 extends from the second emulsification stage 374 to a second fuel nozzle 400 and includes a valve 402 coupled to the control system 28 for selective control of a flow of the water fuel emulsion 382 to the second fuel nozzle 400. The conduit 392 extends from the third emulsification stage 376 to a third fuel nozzle 404 and includes a valve 406 coupled to the control system 28 for selective control of a flow of the third water fuel emulsion 384 to the third fuel nozzle 404. Additional conduits, valves and nozzles are coupled to subsequent emulsification stages 370 until the Nth emulsification stages 378. The conduit 394 extends from the Nth emulsification stage 378 to an Nth fuel nozzle 408, and a valve 410 is disposed along the conduit 394 and coupled to the control system 28 for selective control of the flow of the water fuel emulsion 386 to the Nth fuel nozzle 408. Accordingly, the water fuel emulsification system 18 is configured to enable a controlled flow of different water fuel emulsions from different emulsification stages 370 to different fuel nozzles 228 in the gas turbine engine 12.

As illustrated, the fuel supply system 20, the water supply system 22, and the emulsifying agent supply system 24 are coupled to the first emulsification stage 372. However, one or more of these supplies 20, 22, and 24 may be coupled to each subsequent stage 370, such as the second emulsification stage 374, the third emulsification stage 376, and the Nth emulsification stage 378 to add additional fuel, water, and/or agent when emulsifying the flow from one stage to another. For example, subsequent emulsification stages 370 may receive the same or different fuels and/or agents to alter the composition of the water fuel emulsion.

Figure 5:
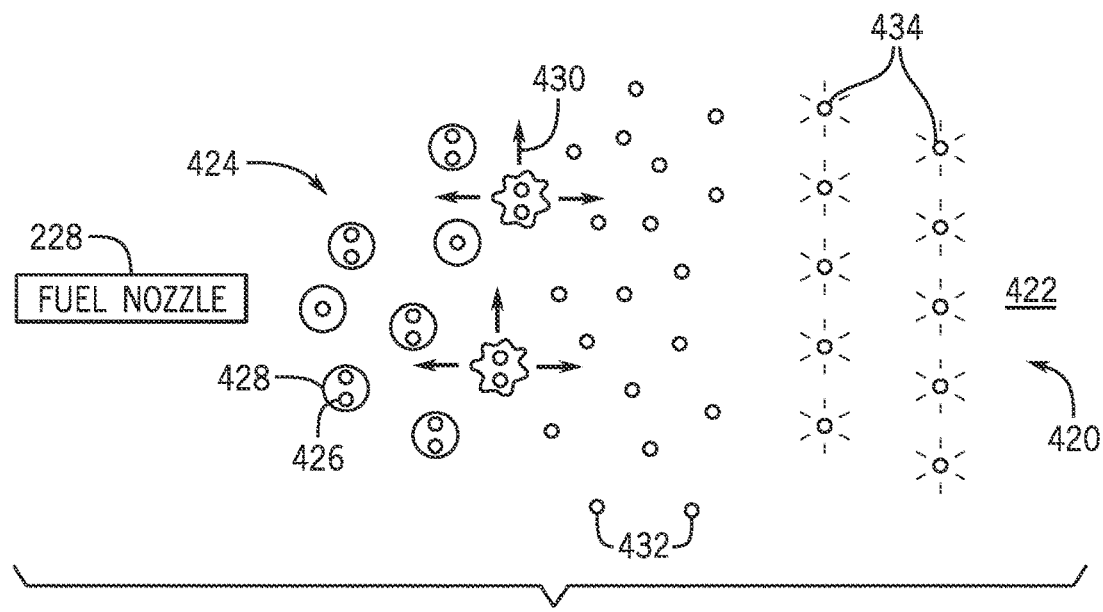
FIG. 5 is a schematic of an embodiment of a water-in-fuel (WIF) emulsion combustion process illustrating micro-explosions of water droplets disposed in larger fuel droplets of an emulsion, and subsequent atomization and combustion of fuel droplets.

FIG. 5 is a schematic of an embodiment of a water-in-fuel (WIF) emulsion combustion process 420 occurring in a combustion zone or chamber 422 downstream from a fuel nozzle 228. The fuel nozzle 228 may correspond to any of the fuel nozzles discussed in detail above, including but not limited to the fuel nozzles 58, 62, 76, 78, 228, 396, 400, 404, and 408. As illustrated, the fuel nozzle 228 injects a water-in-fuel (WIF) emulsion 424 (e.g., a WIF spray formed by a primary atomization) into the combustion chamber 422, such that heat within the combustion chamber 422 helps to cause a micro-explosion of water droplets 426 disposed within each fuel droplet 428. The water droplets 426 evaporate prior to the fuel droplets 428, thereby causing the water droplets 426 to change into a vapor within the body of the fuel droplets 428. The evaporating water droplets 426 create an outward force or pressure to explode the fuel droplets 428 (i.e., micro-explosions), which causes secondary atomization of the fuel droplets 428 into more finely atomized fuel droplets. As illustrated in FIG. 5, arrows 430 indicate the micro-explosion of the fuel droplets 428 caused by evaporation of the interior water droplets 426. The resulting finely atomized fuel droplets are indicated by droplets 432. At this point, the finely atomized fuel droplets rapidly evaporate and mix with the air, and undergo combustion as indicated by combusting fuel droplets 434. This process of micro-explosions of the WIF emulsion 424 provides better combustion, while the water helps to reduce formation of NOx and soot. The WIF emulsion 424 consumes less water than direct water injection (e.g., separate from the fuel), leading to heat rate improvements and fuel savings due to less heat being used to evaporate the water.

Figure 6:
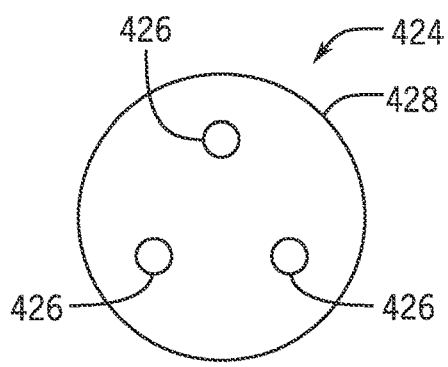
FIG. 6 is a schematic of an embodiment of a water-in-fuel (WIF) emulsion droplet, illustrating small water droplets disposed in a larger fuel droplet.

FIG. 6 is schematic of an embodiment of one of the water-in-fuel (WIF) emulsion droplets 424 of FIG. 5. As illustrated, the WIF droplet 424 has a plurality of water droplets 426 dispersed within a larger fuel droplet 428. The size of the water droplets 426 may depend on various parameters and agitation by the agitators 220 in the emulsifiers 104 as discussed above. For example, the water droplets 426 may have an average diameter of less than 5, 10, 15, or 20 microns. In certain embodiments, the water droplets 426 may have an average diameter of between 1 to 15 microns or between 5 to 10 microns. The size of the fuel droplet 428 may correspond to characteristics of atomization provided by the fuel nozzle 228. For example, the fuel droplets 428 may have an average diameter of between 25 to 200 microns or between 50 to 100 microns. Ranges of droplet size are inclusive of the endpoints of the range.

Figure 7:
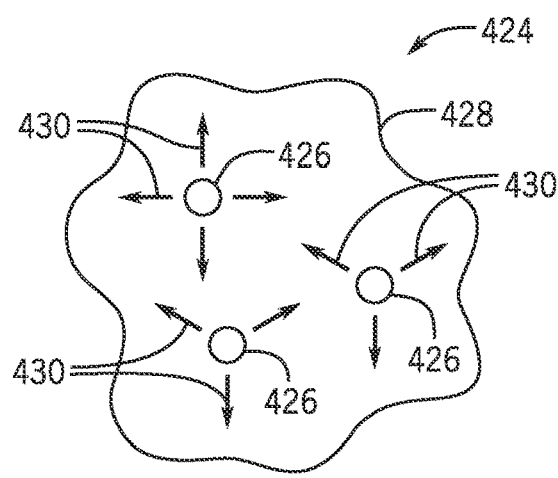
FIG. 7 is a schematic of an embodiment of the water-in-fuel (WIF) emulsion droplet, illustrating the process of micro-explosions of the small water droplets as evaporation occurs inside the larger fuel droplet.

FIG. 7 is a schematic of an embodiment of one of the water-in-fuel (WIF) emulsion droplets 424 of FIG. 5, illustrating the micro-explosions occurring within the WIF emulsion droplet 424. As illustrated, arrows 430 illustrate the outward pressure or force caused by evaporation of the water droplets 426 disposed within the fuel droplet 428. Each fuel droplet 428 may include one or more water droplets 426, such as 1, 2, 3, 4, 5, 6, 7, 8, 9, 10 or more water droplets 426. Each of these water droplets 426 evaporates to cause a micro-explosion in the fuel droplet 428, thereby helping to atomize the fuel droplet 428 into a plurality of finely atomized fuel droplets 432.

Figure 8:
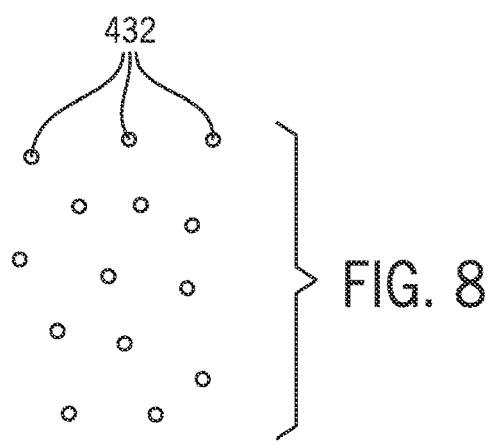
FIG. 8 is a schematic of an embodiment of the small fuel droplets resulting from micro-explosions of water droplets in the water-in-fuel (WIF) emulsion droplet as illustrated in FIGS. 5, 6, and 7.

FIG. 8 is a schematic illustrating the finely atomized fuel droplets 432 (i.e., secondary atomization) resulting from the micro-explosions occurring in the WIF emulsion droplets 424 as discussed above with reference to FIGS. 5, 6, and 7. The finely atomized fuel droplets 432 may have an average diameter of less than 5, 10, 15, 20, 25, or 30 microns. For example, the finely atomized fuel droplets 432 may have an average diameter of between 5 to 10 microns.

Figure 9:
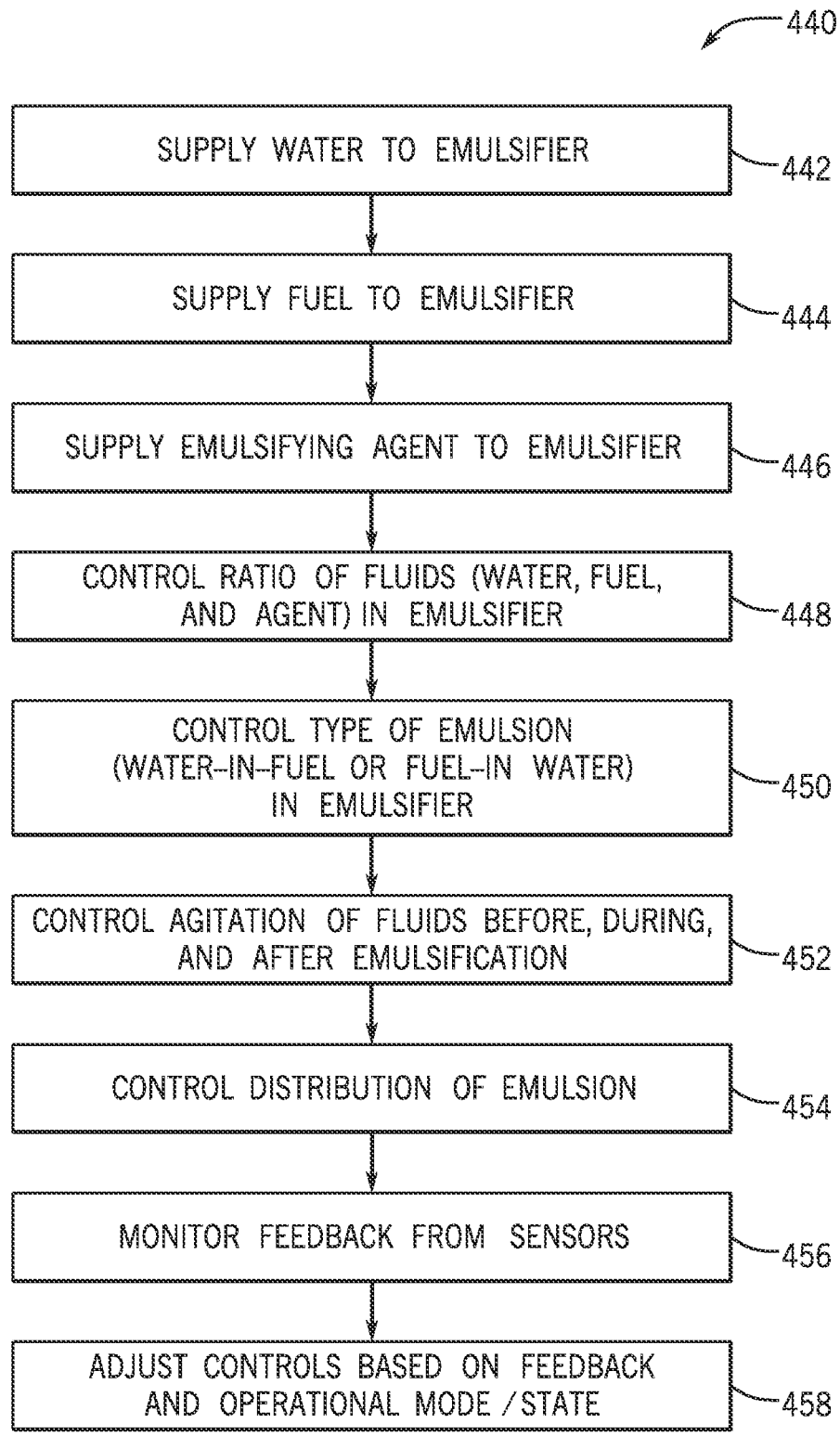
FIG. 9 is a flow chart of an embodiment of a process for combustion of a water fuel emulsion in a gas turbine system as illustrated in FIG. 1

FIG. 9 is a flow chart of an embodiment of a process 440 for combusting a water fuel emulsion within one or more combustors of a gas turbine engine 12 as discussed above. As illustrated, the process 440 may include supplying water to one or more emulsifiers 104 as indicated by block 442, supplying fuel to the one or more emulsifiers 104 as indicated by block 444, and (optionally) supplying an emulsifying agent to one or more emulsifiers 104 as indicated by block 446. Although listed sequentially, it should be understood that the supply of water, fuel, and emulsifying agent can occur in a different order or may occur simultaneously.

The process 440 also includes controlling a ratio of fluids (e.g., water, fuel, and emulsifying agents) in the one or more emulsifiers 104, as indicated by block 448. For example, the ratio between the water, the fuel, and the agent may be varied to provide a greater or lesser amount of water, fuel, or emulsifying agent to change the composition and type of the water fuel emulsion. For example, a greater ratio of fuel relative to water may result in a water-in-fuel (WIF) emulsion having small droplets of water dispersed in a continuous volume or flow of fuel. Alternatively, a greater ratio of water relative to fuel may result in a fuel-in-water (FIW) emulsion, wherein small droplets of fuel are dispersed within a continuous volume or flow of water. Accordingly, the process 440 may include controlling the type of emulsion (e.g., water-in-fuel or fuel-in-water emulsion) in the one or more emulsifiers 104, as indicated by block 450.

The control of the ratios (block 448) and the control of the type of emulsion (block 450) may be closely related to one another, such that varying the ratio of the fluids may also change the type of the emulsion between a WIF type emulsion and a FIW type emulsion. However, controlling the ratio of fluids also may help to change the composition and/or size of the droplets of one fluid suspended inside the other. Additionally, controlling the ratio of fluids (block 448) may include selectively choosing a ratio that excludes or includes one or more emulsifying agents, such as surfactants. The inclusion or exclusion in varying quantities of the emulsifying agents also may have an impact on the overall characteristics of the water fuel emulsion.

The process 440 also may include controlling the agitation of fluids (e.g., water, fuel, and agents) before, during, and after emulsification in the one or more emulsifiers 104, as indicated by block 452. For example, the control of agitation may include controlling any one or more of the agitators 220 discussed in detail above. For example, the control of agitation may include controlling the pressure and flow rate of fuel, water, and agents being injected into the emulsifier 104, the intensity or frequency of vibration by the vibration agitator 290, the intensity and frequency of acoustic agitation provided by the acoustic agitator 288, the rotational speed of the rotary agitators 282 and 284, or any combination thereof.

The process 440 also may include controlling the distribution of the water fuel emulsion, as indicated by block 454. For example, the distribution control 454 may include selectively opening and closing various valves, thereby controlling flows of different emulsions to the various fuel nozzles in the gas turbine engine 12. The distribution control 454 may be configured to distribute the same water fuel emulsions to different fuel nozzles, combustors, and/or gas turbine engines, or to distribute different water fuel emulsions to the different fuel nozzles, combustors, and/or gas turbine engines.

The process 440 also may include monitoring feedback from sensors, as indicated by block 456. For example, the monitoring system 30 may monitor sensor feedback from the sensors 170 as discussed above. The process 440 also may include adjusting controls based on the feedback and operational mode/state of the gas turbine engine 12 and the water fuel emulsification system 18, as indicated by block 458. For example, the control adjustments of block 458 may include changes in characteristics of the water fuel emulsion provided by the water fuel emulsification system 18 depending on an operational mode (e.g., steady state, start-up, shut-down, or transient conditions) of the gas turbine engine 12, a load state (e.g., part load or full load) of the gas turbine engine 12, environmental conditions (e.g., humidity, temperature, or other parameters), emissions requirements, load demands (e.g., power grid demands), or any combination thereof.

Technical effects of the disclosed embodiments include generation, distribution, and combustion of water fuel emulsions in combustors of a gas turbine engine. For example, the water fuel emulsions may be supplied as water-in-fuel (WIF) emulsions, which help to further atomize the fuel as micro-explosions of water droplets occur inside of the fuel droplets. In turn, the fuel is more finely atomized by the micro-explosions, leading to more evaporation of the fuel and better mixing with the air. The fuel in turn is more completely and uniformly combusted in the combustors. As a result, the WIF emulsion helps to reduce formation of NOx and soot in the combustion process, while using less water as compared to separate injection of water into the combustors. For example, the water fuel emulsion (e.g., WIF emulsion) may help to lower NOx emissions by 30 to 50 percent, lower soot emissions by 60 to 90 percent, reduce fuel consumption by 3 to 15 percent, and reduce water consumption by 40 to 60 percent relative to direct water injection (i.e., separate from fuel).

The subject matter described in detail above may be defined by one or more clauses, as set forth below.

A system includes a gas turbine engine having a first combustor with a first fuel nozzle, wherein the first fuel nozzle is configured to supply a water fuel emulsion into the first combustor. The water fuel emulsion includes a water-in-fuel (WIF) emulsion having a plurality of water droplets dispersed in a fuel, wherein the plurality of water droplets is configured to vaporize within the fuel to cause micro-explosions to atomize the fuel, and the atomized fuel is configured to combust to generate a combustion gas. The system further includes a turbine driven by the combustion gas from the first combustor.

The system of the preceding clause, including a controller configured to control generation of the water fuel emulsion to generate the WIF emulsion.

The system of any preceding clause, including an emulsifier configured to emulsify water and fuel to generate the water fuel emulsion, wherein the controller is configured to control a ratio between the water and the fuel to control generation of the water fuel emulsion to generate the WIF emulsion.

The system of any preceding clause, wherein the emulsifier comprises an acoustic agitator, a vibrational agitator, a rotary agitator, a fluid impingement agitator, a stationary agitator, or a combination thereof.

The system of any preceding clause, wherein the controller is configured to control relative amounts of the water, the fuel, and an emulsifying agent supplied to the emulsifier to generate a first composition and, optionally, to generate a second composition; wherein the first composition has a first percentage of the water, a first percentage of the fuel greater than the first percentage of the water, and a first percentage of the emulsifying agent equal to zero; and wherein the second composition has a second percentage of the water greater than the first percentage of the water, a second percentage of the fuel greater than the second percentage of the water and less than the first percentage of the fuel, and a second percentage of the emulsifying agent greater than zero.

The system of any preceding clause, wherein the controller is configured to control the relative amounts supplied to the emulsifier to generate a fuel-in-water (FIW) emulsion with a third composition having a third percentage of the water greater than the first percentage of the water, a third percentage of the fuel greater than the third percentage of the water and less than the first percentage of the fuel, and a third percentage of the emulsifying agent equal to zero.

The system of any preceding clause, wherein the controller is configured to control generation of the water fuel emulsion to generate the WIF emulsion with an average diameter of each water droplet of the plurality of water droplets being less than 15 microns.

The system of any preceding clause, wherein the controller is configured to control generation of the water fuel emulsion to generate a plurality of different water fuel emulsions, including the WIF emulsion.

The system of any preceding clause, wherein the plurality of different water fuel emulsions includes different fuels or fuel percentages, different emulsifying agents or emulsifying agent percentages, different water percentages, or a combination thereof.

The system of any preceding clause, wherein the plurality of different water fuel emulsions comprises different sizes of the plurality of water droplets dispersed in the fuel.

The system of any preceding clause, wherein the controller is configured to control a distribution of the plurality of different water fuel emulsions to a plurality of different fuel nozzles, including the first fuel nozzle.

The system of any preceding clause, wherein the plurality of different fuel nozzles is disposed in the first combustor.

The system of any preceding clause, wherein the plurality of different fuel nozzles is disposed in a plurality of different combustors including the first combustor.

A system includes a controller configured to control a supply of a water fuel emulsion into a first combustor of a gas turbine engine via a first fuel nozzle, the water fuel emulsion includes a water-in-fuel (WIF) emulsion having a plurality of water droplets dispersed in a fuel, wherein the plurality of water droplets is configured to vaporize within the fuel to cause micro-explosions to atomize the fuel, and the atomized fuel is configured to combust to generate a combustion gas to drive a turbine of the gas turbine engine.

The system of the preceding clause, including an emulsifier configured to emulsify water and fuel to generate the water fuel emulsion, wherein the controller is configured to control a ratio between the water and the fuel to control generation of the water fuel emulsion to generate the WIF emulsion.

The system of any preceding clause, wherein the emulsifier comprises an acoustic agitator, and the acoustic agitator comprises an ultrasonic agitator.

The system of any preceding clause, wherein the controller is configured to control generation of the water fuel emulsion to generate a fuel-in-water (FIW) emulsion for supply into the first combustor or a second combustor.

The system of any preceding clause, wherein the controller is configured to control generation of the water fuel emulsion to generate a plurality of different water fuel emulsions, including the WIF emulsion, wherein the controller is configured to control a distribution of the plurality of different water fuel emulsions to a plurality of different fuel nozzles, including the first fuel nozzle.

A method includes supplying a water fuel emulsion into a first combustor of a gas turbine engine via a first fuel nozzle, wherein the water fuel emulsion includes a water-in-fuel (WIF) emulsion having a plurality of water droplets dispersed in a fuel. The method includes vaporizing the plurality of water droplets within the fuel to cause micro-explosions to atomize the fuel. The method further includes combusting the atomized fuel to generate a combustion gas to drive a turbine of the gas turbine engine.

The method of the preceding clause, including controlling generation of the water fuel emulsion to generate a plurality of different water fuel emulsions, including the WIF emulsion, and controlling a distribution of the plurality of different water fuel emulsions to a plurality of different fuel nozzles, including the first fuel nozzle.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a plurality of emulsifier stages arranged in series with one another;
a plurality of fuel nozzles coupled to different respective stages of the plurality of emulsifier stages via a respective plurality of conduits, wherein the plurality of emulsifier stages is configured to supply a plurality of different water fuel emulsions to the plurality of fuel nozzles, wherein a first fuel nozzle of the plurality of fuel nozzles is configured to receive a water fuel emulsion of the plurality of different water fuel emulsions and provide the water fuel emulsion to a combustor section of a gas turbine engine, wherein the water fuel emulsion comprises a water-in-fuel (WIF) emulsion having a plurality of water droplets dispersed in a fuel, wherein the plurality of water droplets is configured to vaporize within the fuel to cause micro-explosions to atomize the fuel, wherein the atomized fuel is configured to combust to generate a combustion gas to drive a turbine of the gas turbine engine;
a gas turbine controller configured to control the supply of the plurality of different water fuel emulsions from the different respective stages of the plurality of emulsifier stages through the respective plurality of fuel nozzles into the combustor section, wherein the gas turbine controller is configured to change characteristics of the plurality of different water fuel emulsions, including the WIF emulsion, based on one or more of: an operational mode of the gas turbine engine, a load state of the gas turbine engine, or load demands of the gas turbine engine, wherein the gas turbine controller is configured to selectively control flows from each of the plurality of emulsifier stages to the plurality of fuel nozzles to change the characteristics of the plurality of different water fuel emulsions in the combustor section.

2. The system of claim 1, wherein the gas turbine controller is configured to control a ratio between the water and the fuel in the plurality of emulsifier stages to control generation of each of the plurality of different water fuel emulsions, including the WIF emulsion.

3. The system of claim 1, wherein at least one of the plurality of emulsifier stages comprises an acoustic agitator, and the acoustic agitator comprises an ultrasonic agitator.

4. The system of claim 1, wherein the gas turbine controller is configured to control generation of the plurality of different water fuel emulsions, including a fuel-in-water (FIW) emulsion, for supply into the combustor section.

5. The system of claim 1, wherein the gas turbine controller is configured to control a distribution of the plurality of different water fuel emulsions to the plurality of different fuel nozzles, wherein the plurality of emulsifier stages comprises at least three emulsifier stages in series with one another.

6. A system, comprising:
a gas turbine engine, comprising:
  a plurality of emulsifier stages arranged in series with one another;
  a plurality of fuel nozzles coupled to different respective stages of the plurality of emulsifier stages via a respective plurality of conduits, wherein the plurality of emulsifier stages is configured to supply a plurality of different water fuel emulsions to the plurality of fuel nozzles;
  a combustor section having the plurality of fuel nozzles, wherein the combustor section comprises a first combustor comprising at least a first fuel nozzle of the plurality of fuel nozzles, wherein the first fuel nozzle is configured to supply a water fuel emulsion of the plurality of different water fuel emulsions into the first combustor, the water fuel emulsion comprises a water-in-fuel (WIF) emulsion having a plurality of water droplets dispersed in a fuel, wherein the plurality of water droplets is configured to vaporize within the fuel to cause micro-explosions to atomize the fuel, and the atomized fuel is configured to combust to generate a combustion gas; and
  a turbine driven by the combustion gas from the first combustor; and
a controller configured to change characteristics of the plurality of different water fuel emulsions, including the WIF emulsion, based on one or more of: an operational mode of the gas turbine engine, a load state of the gas turbine engine, environmental conditions, emissions requirements, or load demands, wherein the controller is configured to selectively control flows from each of the plurality of emulsifier stages to the plurality of fuel nozzles to change the characteristics of the plurality of different water fuel emulsions in the combustor section.

7. The system of claim 6, wherein the controller is configured to change characteristics of the plurality of different water fuel emulsions, including the WIF emulsion, based on two or more of: the operational mode of the gas turbine engine, the load state of the gas turbine engine, the environmental conditions, the emissions requirements, and the load demands.

8. The system of claim 6, wherein each of the plurality of emulsifier stages comprises one or more agitators configured to emulsify water and fuel to generate the water fuel emulsion, wherein the controller is configured to control the one or more agitators and a ratio between the water and the fuel to change characteristics of the WIF emulsion.

9. The system of claim 8, wherein the one or more agitators comprises an acoustic agitator, a vibrational agitator, a rotary agitator, a fluid impingement agitator having first and second fluid injectors, or a combination thereof.

10. The system of claim 8, wherein the controller is configured to control relative amounts of the water, the fuel, and an emulsifying agent supplied to each of the plurality of emulsifier stages to selectively generate the WIF emulsion with a first composition and to selectively generate the WIF emulsion with a second composition; wherein the first composition of the WIF emulsion has a first percentage of the water greater than zero, a first percentage of the fuel greater than the first percentage of the water, and a first percentage of the emulsifying agent equal to zero; and wherein the second composition of the WIF emulsion has a second percentage of the water greater than the first percentage of the water, a second percentage of the fuel greater than the second percentage of the water and less than the first percentage of the fuel, and a second percentage of the emulsifying agent greater than zero.

11. The system of claim 10, wherein the controller is configured to control the relative amounts supplied to each of the plurality of emulsifier stages to generate a fuel-in-water (FIW) emulsion with a third composition having a third percentage of the water greater than the first percentage of the water, a third percentage of the fuel greater than the third percentage of the water and less than the first percentage of the fuel, and a third percentage of the emulsifying agent equal to zero.

12. The system of claim 8, wherein the controller is configured to control the one or more agitators of each of the plurality of emulsifier stages to generate the WIF emulsion with an average diameter of each water droplet of the plurality of water droplets being less than 15 microns.

13. The system of claim 6, wherein the controller is configured to selectively control the flows from each of the plurality of emulsifier stages to the plurality of fuel nozzles via control of a respective plurality of valves coupled to the plurality of conduits.

14. The system of claim 6, wherein the plurality of different water fuel emulsions comprises different fuels and fuel percentages, different emulsifying agents or emulsifying agent percentages, and different water percentages.

15. The system of claim 6, wherein the plurality of different water fuel emulsions comprises different average sizes of the plurality of water droplets dispersed in the fuel for each of the plurality of different water fuel emulsions.

16. The system of claim 6, wherein the controller is configured to control a distribution of the plurality of different water fuel emulsions to the plurality of different fuel nozzles, including the first fuel nozzle, wherein the plurality of fuel nozzles is disposed in the first combustor and/or a plurality of different combustors including the first combustor.

17. The system of claim 6, wherein the plurality of emulsifier stages comprises at least three emulsifier stages in series with one another.

18. The system of claim 6, wherein the controller is configured to change the characteristics of the plurality of different water fuel emulsions, including the WIF emulsion, the characteristics comprising a ratio between the water and the fuel, a selection of the fuel between different fuels, a temperature, and an average droplet size, wherein the controller is further configured to change the characteristics of the plurality of different water fuel emulsions to selectively provide from the plurality of emulsifier stages the WIF emulsion and a fuel-in-water (FIW) emulsion.

19. A method of operating a system, the system comprising a gas turbine engine comprising a plurality of emulsifier stages arranged in series with one another, a plurality of fuel nozzles coupled to different respective stages of the plurality of emulsifier stages via a respective plurality of conduits, the plurality of emulsifier stages being configured to supply a plurality of different water fuel emulsions to the plurality of fuel nozzles, the gas turbine engine further comprising a combustor section having the plurality of fuel nozzles, wherein the combustor section comprises a first combustor comprising at least a first fuel nozzle of the plurality of fuel nozzles, wherein the first fuel nozzle is configured to supply a water fuel emulsion of the plurality of different water fuel emulsions into the first combustor, the water fuel emulsion comprises a water-in-fuel (WIF) emulsion having a plurality of water droplets dispersed in a fuel, wherein the plurality of water droplets is configured to vaporize within the fuel to cause micro-explosions to atomize the fuel, and the atomized fuel is configured to combust to generate a combustion gas, and the gas turbine engine further comprising a turbine driven by the combustion gas from the first combustor, and a controller configured to change characteristics of the plurality of different water fuel emulsions, including the WIF emulsion, based on one or more of: an operational mode of the gas turbine engine, a load state of the pas turbine engine, environmental conditions, emissions requirements, or load demands, wherein the controller is configured to selectively control flows from each of the plurality of emulsifier stages to the plurality of fuel nozzles to change the characteristics of the plurality of different water fuel emulsions in the combustor section, the method comprising:

supplying the plurality of different water fuel emulsions from the plurality of emulsifier stages through the plurality of fuel nozzles into the combustor section of the gas turbine engine;

changing the characteristics of the plurality of different water fuel emulsions, via commands from the controller;

selectively controlling, via commands from the controller, the flows from each of the plurality of emulsifier stages to the plurality of fuel nozzles;

vaporizing the plurality of water droplets within the fuel of the WIF emulsion to cause micro-explosions to atomize the fuel; and combusting the atomized fuel to generate the combustion gas to drive the turbine.

20. The method of claim 19, wherein the plurality of emulsifier stages comprises at least three emulsifier stages in series with one another; the method further comprising controlling a distribution of the plurality of different water fuel emulsions to the plurality of fuel nozzles.

* * * * *